April 22, 1969  S. HERTELL  3,439,500
HYDRAULIC CONTROL SYSTEM FOR VEHICULAR BRAKES AND THE LIKE
Filed March 1, 1967
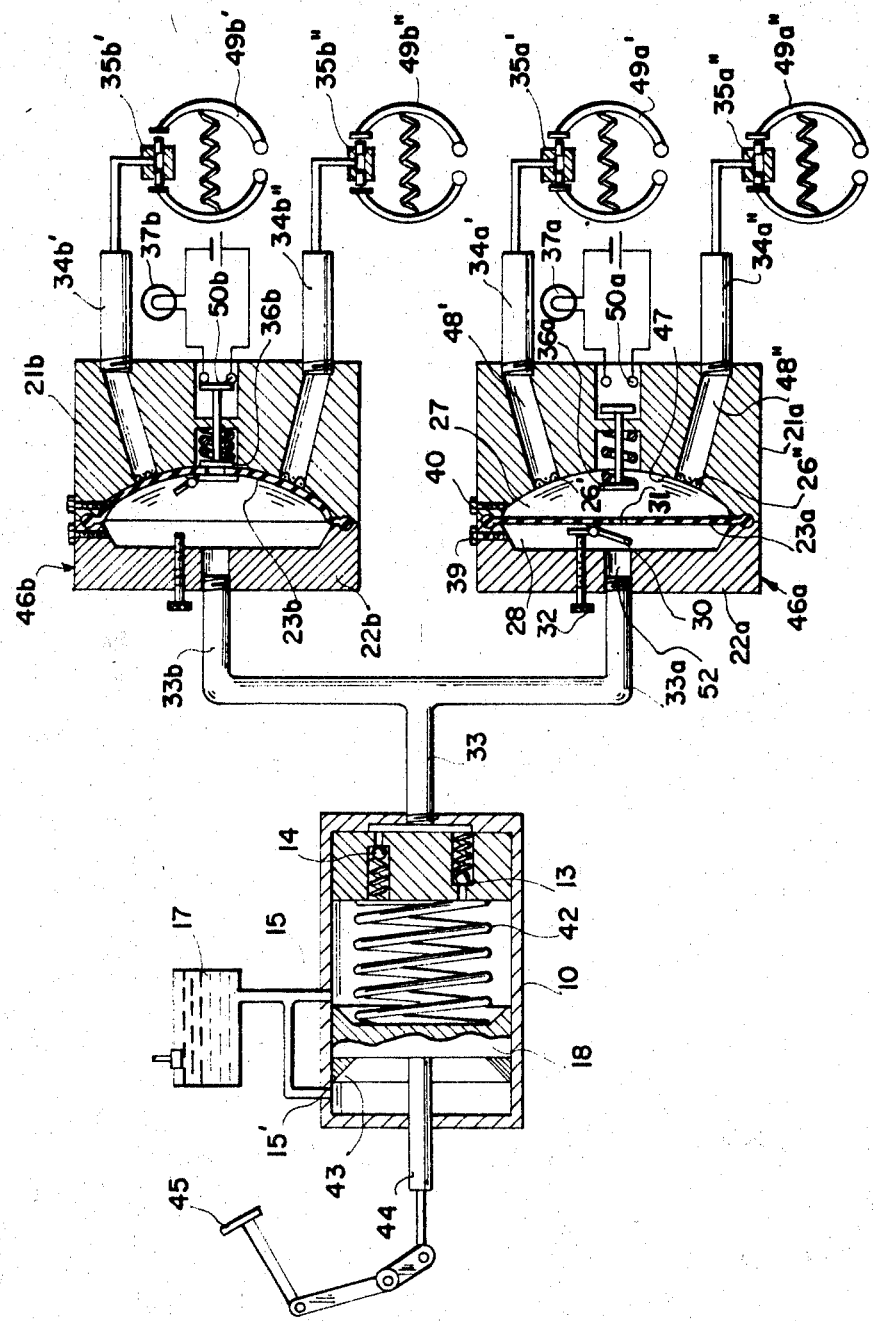
SIEGFRIED HERTELL
*INVENTOR.*
BY
*Karl J. Ross*
*Attorney*

United States Patent Office 3,439,500
Patented Apr. 22, 1969

3,439,500
HYDRAULIC CONTROL SYSTEM FOR VEHICULAR BRAKES AND THE LIKE
Siegfried Hertell, Kelsterbach (Main), Germany, assignor to Ate A. Teves, Maschinen- und Armaturen-fabrik KG, Frankfurt am Main, Germany, a company of Germany
Filed Mar. 1, 1967, Ser. No. 619,859
Claims priority, application Germany, Mar. 3, 1966, T 30,575
Int. Cl. F15b 20/00; B60t 17/22; B16t 15/46
U.S. Cl. 60—54.5                                10 Claims

ABSTRACT OF THE DISCLOSURE

Hydraulic brake system, particularly for automotive vehicles, wherein one or more wheel cylinders associated with respective wheel brakes are connected to a master cylinder via conduits including at least one safety cylinder which is subdivided by a resilient membrane into two chambers, one on the side of the master cylinder, the other on the side of wheel cylinder or cylinders; upon actuation of the master cylinder piston by a brake pedal, fluid pressure deflects the membrane toward an outlet port of the brake-side chamber communicating with each wheel cylinder until, in the event of a leak in the hydraulic circuit on that side, the membrane comes to rest against a wall of the safety cylinder and actuates an alarm switch provided on this wall. The membrane may have a bleeder orifice provided with an at least unidirectionally effective closure member for blocking fluid flow from the master cylinder side to the brake side except in a normal position of the membrane remote from the brake-side outlet, thereby eliminating the cumulative effect of very small fluid losses at the brake side.

---

My present invention relates to a hydraulic control system as used, for example, to operate the brakes of automotive vehicles.

In such hydraulic systems there is generally provided a master cylinder which supplies fluid under pressure, such as oil, to the load or loads to be actuated, i.e. the several wheel cylinders associated with the hydraulic brakes in the case of an automotive vehicle. If a leak develops in a fluid line or in one of the cylinders served thereby, the application of pressure to the supply cylinder (e.g. by a brake pedal) becomes ineffectual not only for the affected wheel cylinder but also for any other wheel cylinder connected in parallel therewith. This situation, of course, is highly dangerous in a fast-moving vehicle; hence a number of solutions of greater or less complexity and varying degrees of dependability have already been proposed to remedy this defect.

The general object of my invention is to provide simple and reliable means in such hydraulic system for alerting an operator to the existence of a leak and/or avoiding excessive power loss in a fluid line upon the development of leakage in another fluid line connected to the same master cylinder.

A more particular object of this invention is to provide means in such system for establishing a preferably adjustable leakage threshold below which the system will function normally, even in the presence of minor fluid losses on the load side, whereas a pressure drop indicative of leakage beyond such threshold will establish an alarm condition either immediately or after several successive actuations.

The foregoing objects are realized, in accordance with my invention, by the interposition of a safety cylinder in the hydraulic connection between the supply or master cylinder and the associated load or loads (e.g. wheel cylinders), this safety cylinder being subdivided into two chambers (one on the supply side, the other on the load side) by a mobile element, preferably in the form of a resilient membrane, which acts as a piston adapted to transmit the operating fluid pressure from the supply cylinder to the load. Normally, this mobile element is held in a position remote from the discharge port of the load-side chamber by its inherent stress and/or by the reaction of the spring-loaded brake or other reverse-biased load associated therewith. As long as the maximum stroke of this element toward the aforementioned discharge port results in a volume change of the load-side chamber which is greater than that required for the operation of the load, this being the case whenever the load-side conduits are tight so that the fluid does not leak out, the element will move only over a fraction of its greatest stroke length and will thereupon return to its normal position. If, however, a leak has developed, the load-side drop in pressure results in a displacement of the mobile element into a limiting position proximal to the load-side discharge port whereupon, having thus reached the end of its mobility, the element will not transmit any further pressure loss to the supply side so that any other line fed from the supply cylinder will receive enough pressure fluid to operate its own load. Also, pursuant to a further feature of my invention, the mobile element in this limiting position trips a switch which operates an alarm indicator.

Advantageously, according to still another feature of my invention, the mobile element or membrane is provided with an orifice for the equalization of the fluid pressure in the two chambers under normal conditions, this orifice being closable by a shutter adapted to block at least the passage of fluid from the supply side to the load side of the safety cylinder. In the normal retracted position of the mobile element (i.e. in the distended state of the membrane), the shutter coacts with a formation inside the safety cylinder which unblocks the orifice so that very small fluid losses on the load side may be compensated. If these losses exceed a threshold value, which may be selected by adjustment of the coacting formation, the reaction of the load-side fluid no longer suffices to restore the mobile element to its normal position against the residual supply pressure in the unoperated state of the control system so that the shutter is not withdrawn from the orifice and the load-side chamber of the safety cylinder remains sealed off from the fluid supply. Thus, upon successive actuations, the cumulative loss of fluid will eventually cause the mobile element to reach its limiting off-normal position in which it actuates the alarm switch.

The above and other features of my invention will become more fully apparent from the following detailed description of a representative embodiment shown diagrammatically in the sole figure of the accompanying drawing.

The system shown in the figure comprises a master cylinder 10 with a piston 18 normally pressed by a spring 42 against a backstop 43. Piston 18 is connected through a conventional linkage 44 with an operating member in the form of a brake pedal 45. A fluid reservoir 17 communicates with the interior of cylinder 10 via two inlet ports 15 and 15', port 15 opening into the space before the piston 18 and being blocked by that piston upon commencement of its rightward operating stroke. Two oppositely disposed check valves 13, 14 enable two-way communication between the interior of cylinder 10 and a supply conduit 33 which divides into two branches 33a, 33b leading to respective safety cylinders 46a, and 46b in accordance with this invention.

Each of these safety cylinders consists of two complementary housing portions 21a, 22a and 21b, 22b, respectively, which are held together by suitable means not shown and between which there is clamped a mobile element in the form of an elastic membrane 23a or 23b. As particularly illustrated for cylinder 46a, this membrane subdivides the interior thereof into a load-side chamber 27 and a supply-side chamber 28. Chamber 27 has a concave wall surface 47 provided with a pair of discharge ports 48', 48" which communicate with respective conduits 34a', 35a" forming part of the brake assemblies 49a', 49a" of a pair of vehicle wheels, not shown, e.g. the rear wheels of a motor car equipped with the system illustrated. Screens 26', 26" overlie the two ports 48', 48" to prevent an intrusion of membrane 23a into these ports upon its deflection against the confronting wall surface 47, as shown for the membrane 23b. A switch 36a, projecting slightly from wall 47, controls a pair of normally open contacts 50a adopted to energize an alarm device (e.g. dashboard lamp) 37a when closed.

In an analogous manner, housing portion 21b is provided with outgoing conduits 34b', 34b" which lead to wheel cylinders 35b', 35b" associated with respective brakes 49b', 49b", e.g. on the front wheels of the vehicle. An alarm device 37b can be energized by a membrane-actuated switch 36b co-operating with a pair of contacts 50b.

Each membrane, as particularly indicated for element 23a, is provided at its center with a narrow orifice 31 overlain by a shutter plate 30 which is pivotally attached to the membrane at 51. A screw bolt 32 forms an adjustable abutment for an extension of shutter plate 30 whereby the latter can be deflected to unblock the orifice 31 as soon as the membrane 23a assumes its undistended normal position adjacent the entrance port 52. The two chambers 28, 27 can be vented to the atmosphere, e.g. during filling, by means of respective passages normally closed by screws 39 and 40. Check valve 14 maintains a residual fluid pressure, generated by the restoring springs of the brakes 49a etc., in the conduit system 33, 34a' etc.; check valve 13 prevents a draining of reservoir 17 during venting or upon temporary disconnection of the safety cylinders 46a, 46b from master cylinder 42.

In the normal position of the unoperated system, illustrated for membrane 23a, the shutter 30 is open and the fluid pressure is equalized between the two chambers 27, 28. Since the diameter of orifice 31 is much smaller than that of inlet 52, the exertion of even a slight foot pressure upon pedal 45 (with consequent displacement of piston 18, blocking of port 15 and opening of valve 13) deflects the membrane to the right, thereby disengaging shutter 30 from screw 32 and blocking the orifice 31. If the conduits 34a', 34a" and the associated wheel cylinders 35a', 35a" are substantially free from leakage, membrane 23a will not reach the wall surface 47 before the brakes 49a', 49a" are fully actuated. Thus, switch 36a remains unoperated and warning lamp 37a is not lit. If, on the other hand a leak develops on the load side of the system, e.g. in conduit 34b, the corresponding membrane (here element 23b) is fully deflected and actuates the switch 36b so that contacts 50b are closed and lamp 37b lights to indicate a defect. The volume of master cylinder 10 is, however, sufficient even under these conditions to ensure full operative deflection of the membrane (23a) associated with the intact branch of the system.

If only a slight loss of fluid occurs in, say, the conduit 34a' during each brake-actuating stroke, membrane 23a will return to its illustrated retracted position so that the withdrawal of shutter 30 by screw 32 will restore the fluid balance on the two sides of the membrane. If, however, the leakage is more substantial, even though insufficient to cause immediate deflection of membrane 23a into engagement with switch 36a, the return movement of the membrane will not restore it to its fully undistended state so that shutter 30 remains closed and no equalization takes place. In this case, owing to the continuing leakage, the fluid losses during successive actuations will be cumulative and the membrane will eventually hug the surface 47 to operate the alarm 37a. The leakage threshold beyond which the system responds in this manner may be readily varied by adjusting the screw 32.

Naturally, the system herein disclosed may be extended at will at any number of loads and/or safety cylinders compatible with the capacity of a given master cylinder. These and other modifications, readily apparent to persons skilled in the art, are thus deemed to come within the spirit and scope of my invention as defined in the appended claims.

I claim:

1. A hydraulic control system comprising a source of hydraulic fluid; a reverse-biased load operable by said fluid; a supply cylinder connected to said source and provided with piston means actuable to exert pressure upon said fluid; conduit means interconnecting said supply cylinder and said load; a safety cylinder in said conduit means between said supply cylinder and said load; a mobile element subdividing the interior of said safety cylinder into two chambers, one of said chambers communicating with said supply cylinder through a first section of said conduit means, the other of said chambers communicating with said load through a second section of said conduit means, the maximum stroke of said element corresponding to a volume change in said other of said chambers greater than that required for actuation of said load in the absence of a leak in said second section; switch means in said other of said chambers operable by said element in a limiting position thereof proximal to said second section of said conduit means, said element being a resilient membrane, said other of said chambers having a concave wall surface confronting said membrane, said switch means being disposed on said concave wall surface for actuation by said membrane upon a distension thereof into area contact with said surface.

2. A hydraulic control system comprising a source of hydraulic fluid; a reverse-biased load operable by said fluid; a supply cylinder connected to said source and provided with piston means actuatable to exert pressure upon said fluid; conduit means interconnecting said supply cylinder and said load; a safety cylinder in said conduit means between said supply cylinder and said load; and a mobile element subdividing the interior of said safety cylinder into two chambers, one of said chambers communicating with said supply cylinder through a first section of said conduit means, the other of said chambers communicating with said load through a second section of said conduit means, the maximum stroke of said element corresponding to a volume change in said other of said chambers greater than that required for actuation of said load in the absence of a leak in said second section, said element being provided with a bleeder orifice having closure means for obstructing same at least against flow of fluid from said one to said other of said chambers, said closure means coacting with a formation in said one of said chambers for unblocking said orifice in a limiting position of said element proximal to said first section of said conduit means.

3. A control system as defined in claim 2 wherein said element is under stress of a restoring force tending to maintain said element in a normal position sufficiently close to said formation to unblock said orifice for bidirectional flow-through.

4. A control system as defined in claim 2, further comprising switch means in said other of said chambers operable by said element in a limiting position thereof proximal to said second section of said conduit means.

5. A control system as defined in claim 4 wherein said element is a resilient membrane, said other of said chambers having a concave wall surface confronting said membrane, said switch means being disposed on said concave wall surface for actuation by said membrane upon a distension thereof into area contact with said surface.

6. A control system as defined in claim 5 wherein said second section of said conduit means opens into said other of said chambers by a port located at a point of said concave wall surface remote from the undistended membrane, said switch means being disposed in the vicinity of said port.

7. A control system as defined in claim 6, further comprising screen means overlying said port for preventing intrusion of said membrane into same.

8. A control system as defined in claim 5 wherein said safety cylinder comprises two complementary housing portions clamping said membrane between them.

9. A control system as defined in claim 8 wherein each of said housing portions is provided with a normally closed outlet for venting the respective chamber to the atmosphere.

10. A hydraulic control system comprising a source of hydraulic fluid; a reverse-biased load operable by said fluid; a supply cylinder connected to said source and provided with piston means actuatable to exert pressure upon said fluid; conduit means interconnecting said supply cylinder and said load; a safety cylinder in said conduit means between said supply cylinder and said load; a mobile element subdividing the interior of said safety cylinder into two chambers, one of said chambers communicating with said supply cylinder through a first section of said conduit means, the other of said chambers communicating with said load through a second section of said conduit means, the maximum stroke of said element corresponding to a volume change in said other of said chambers greater than that required for actuation of said load in the absence of a leak in said second section; switch means in said other of said chambers operable by said element in a limiting position thereof proximal to said second section of said conduit means, said element being a resilient membrane, said other of said chambers having a concave wall surface confronting said membrane, said switch means being disposed on said concave wall surface for action by said membrane upon a distension thereof into area contact with said surface, said membrane is provided with a substantially centrally disposed orifice and with at least unidirectionally effective closure means for preventing fluid flow from said one to said other of said chamber; and adjustable stop means in said one of said chambers adapted and arranged for engagement with said closure means to open said orifice in a substantially undistended position of said membrane.

References Cited

UNITED STATES PATENTS

| | | |
|---|---|---|
| 1,986,764 | 1/1935 | Rhodes. |
| 2,062,798 | 12/1936 | Sabins. |
| 2,246,621 | 6/1941 | Davis. |
| 2,624,176 | 1/1953 | Osborne. |
| 2,824,627 | 2/1958 | Winter _____ 188—151.11 |
| 2,860,486 | 11/1958 | Berg et al. |

FOREIGN PATENTS

| | | |
|---|---|---|
| 922,078 | 1/1947 | France. |
| 1,115,245 | 12/1955 | France. |

MARTIN P. SCHWADRON, *Primary Examiner.*

R. R. BUNEVICH, *Assistant Examiner.*

U.S. Cl. X.R.

188—151; 303—84